United States Patent [19]

Nigg

[11] 4,087,176

[45] May 2, 1978

[54] SYSTEM FOR OVERALL COLOR CORRECTION OF COLOR PICTURE INFORMATION CONTAINED IN A PROJECTING MULTI-COLOR LIGHT BEAM

[76] Inventor: Jurg Nigg, Beckenhofstrasse 30, 8006 Zurich, Switzerland

[21] Appl. No.: 704,728

[22] Filed: Jul. 12, 1976

Related U.S. Application Data

[63] Continuation-in-part of Ser. No. 424,040, Dec. 12, 1973, abandoned.

[51] Int. Cl.² .............................................. G03B 27/76
[52] U.S. Cl. ......................................... 355/35; 355/88; 358/6; 358/76
[58] Field of Search ................. 355/35, 38, 88; 358/6, 358/9, 54, 63, 76, 78

[56] References Cited

U.S. PATENT DOCUMENTS

| | | | |
|---|---|---|---|
| 2,776,335 | 1/1957 | Mann | 358/54 |
| 2,947,810 | 8/1960 | Horsley | 355/38 X |
| 3,120,782 | 2/1964 | Goddard et al. | 355/38 X |
| 3,588,246 | 6/1971 | July | 355/38 |
| 3,697,174 | 10/1972 | McCune | 358/76 X |
| 3,702,733 | 11/1972 | Sokolow | 355/35 X |
| 3,772,465 | 11/1973 | Vlahos et al. | 358/6 X |
| 3,795,761 | 3/1974 | Metzger | 358/6 |

*Primary Examiner*—Richard A. Wintercorn
*Attorney, Agent, or Firm*—Lawrence Rosen; E. Janet Berry

[57] ABSTRACT

A color correction system contains a plurality of color channels which each contain a dichroic mirror and an electro-optical modulator. An unpolarized light source shining through a color transparency serves as the input to each channel, and each color is individually controlled by the electro-optical modulator in its respective channel. The colors of each channel are then recombined after correction. In another embodiment of the invention, each channel further includes black and white film storage means to store the color image of the particular channel or inexpensive black and white film for subsequent reconstruction as a color picture.

24 Claims, 8 Drawing Figures

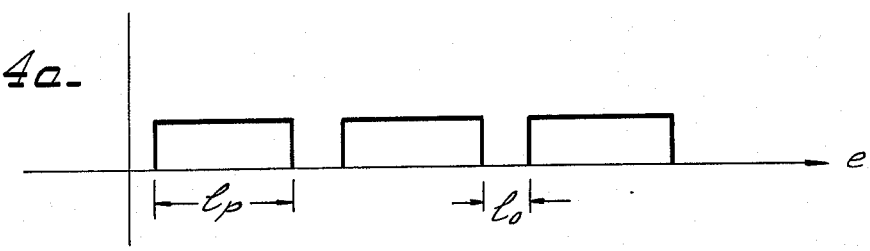
FIG. 4a.
FIG. 4b.
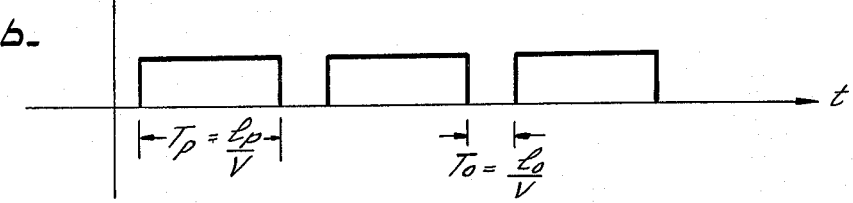
FIG. 4c.
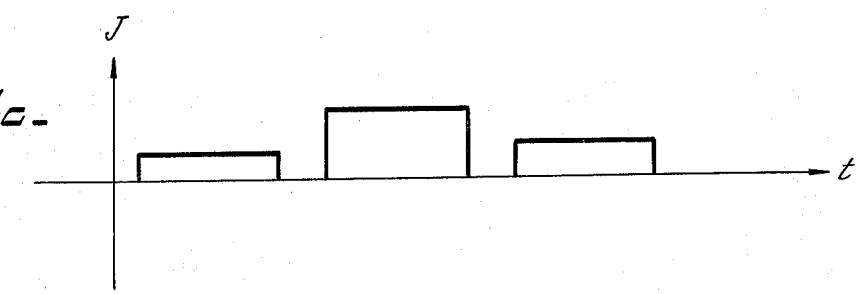
FIG. 4d.
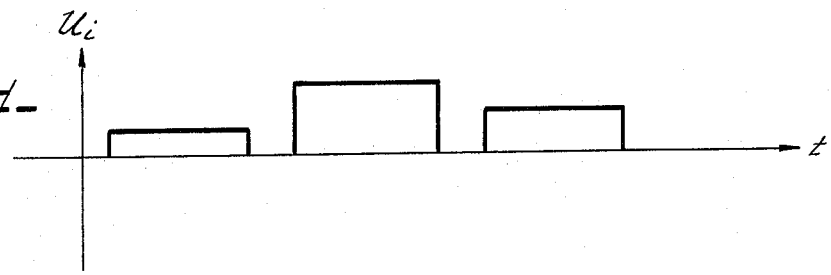
FIG. 4e.
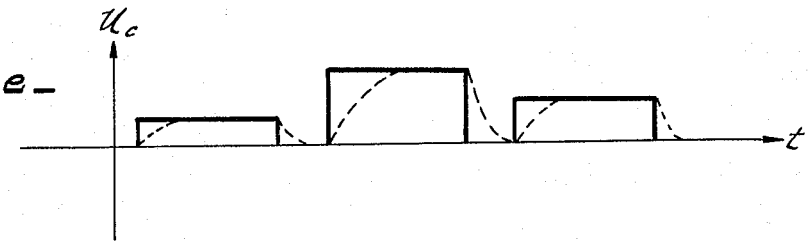

SYSTEM FOR OVERALL COLOR CORRECTION OF COLOR PICTURE INFORMATION CONTAINED IN A PROJECTING MULTI-COLOR LIGHT BEAM

RELATED APPLICATION

This application is a continuation-in-part of U.S. application Ser. No. 424,040, filed Dec. 12, 1973 now abandoned.

BACKGROUND OF THE INVENTION

This invention relates to a color separation and additive color mixing system for photographic, cinematographic and/or telecommunication equipment, with means for intensity control of the various color channels, and with means for black and white storage of the color information in each color channel.

In one embodiment of the invention, the system can be used to store color and contour picture information contained in a single multi-color light beam on several black and white film media. For this purpose the light beam, comprising color and contour information of a colored picture, is split into several mono-color beams of selected color band, e.g., in three beams having the three basic colors red, green and blue, respectively. The mono-color beams are individually intensity corrected by light modulators without losing any of their contour information. After these intensity corrections, the contour information and the overall mono-color intensity information of the mono-color beams can be stored on black and white film media. With this technique, it becomes possible to store multi-color pictures from either color films, color transparencies, or from directly projected images from natural surroundings on black and white film which is much cheaper than color film. Any suitable black and white film can be used, including those that do not require silver, these films being much less expensive than presently available color films.

The same system can be used to reproduce color pictures from black and white film media, each color of the picture being stored on respective black and white film pictures, according to the number of color channels used in the storage process. The different film media which contain each contour and mono-color intensity information of a stored multi-color picture are respectively positioned in a mono-color light beam which is produced by splitting a multi-color light beam into mono-color light beams of the same color band as the light beams which were used for production of the black and white film media. After modulation by the films, the mono-color light beams will contain the correct contour and intensity information of the picture to be projected. Here again, intensity can be corrected by light modulators in the mono-color beams and a resulting multi-color beam produced by additively mixing the mono-color beams will reproduce the stored multi-color picture with corrected color components.

The novel system of the invention is also useful for film copying techniques, copying one color film from another, the color composition of the former being corrected in each color channel. Splitting of the image into color channels and recombining the mono-color channels can be performed in one step without intermediate storing on black and white film media or on mono-color film media.

Known devices for controlling light intensity include mechanical shutters, sometimes called light modulators. The shutters may be mechanically controlled by double flaps moved by a servo-motor. These techniques are disadvantageous in that the switching time for changing the light amplitude between 0 and 100% is relatively long, typically about $2 \times 10^{-3}$ seconds. Owing to this disadvantage, it is practically impossible, in film copying techniques, to exceed printing speeds of about 3000 m/h. For high quality prints, the maximum speed now used is as low as 2000 m/h.

A second disadvantage of the above-mentioned mechanical shutters is that they switch over with residual oscillations or bounce, which results in significant color flicker, lowering the quality of color pictures.

A third significant disadvantage is that mechanical shutters do not permit infinite variation of the intensity of a modulated beam. Moreover, since intensity modulation is always performed by changing aperture cross-section, the picture periphery will be damaged without additional optics.

In another known light-intensity control device, a number of filters, for instance eight filters, are shot into a magazine filled with silicone oil by compressed air. This system is of the mechanical type and also has the first two disadvantages mentioned above for the shutter.

It is one object of the present invention to provide an overall color correction system which has a substantially shorter switching time for intensity control and better color separation between the various color channels, so that color pictures of higher quality can finally be obtained than was heretofore possible.

Another object of this invention is to provide an inexpensive method and apparatus for storage of color images on black and white film.

The arrangement of the present invention allows substantial reduction of the switchover time for intensity level variations. Thus, the invention provides a system which comprises anti-reflex coated dichroic filter glasses for the purpose of color separation, and further comprises controlled electro-optical or magneto-optical cells for intensity control of the various color channels and which permit short-time control of the color channels in such a manner that intensity control with respect to the color channels takes place without overlapping and without any residual oscillation. This arrangement substantially reduces the switching time for impulse control.

The switching time from a maximum transparency to a minimum may be shorter than $10^{-5}$ seconds. With this improvement, it is possible to make film copying machines which are able to process film at a speed of about 30,000 m/h.

As compared to the mechanical behavior of mechanical shutters, electric switching behavior of the modulators' control elements can be varied, and the switching behavior exactly predicted and modified. The use of electro-optic or magneto-optic light modulators ensures that the change from one transparency level to another can be optimally fitted to individual needs. By enlarging the rising or falling times in switching from one level to another according to correction values of subsequent pictures, one can smooth the switch-over from one picture to the next. As the switching behavior of electric circuits (step response) is given by their damping factors, the influence of one switching cycle to the next can be influenced by changing this factor, so that step response of the circuit will reach a "low" value only to a selectable amount before the next positive switching step is applied. If the step response reaches a "low" value before the next positive switching step is applied, overlapping can completely be omitted.

BRIEF DESCRIPTION OF THE DRAWING

Several embodiments of the invention will now be described hereafter by way of examples with reference to the accompanying drawings.

FIG. 4a shows a picture sequence, e.g., on a film medium.

FIG. 4b shows the time relations during which a picture sequence according to FIG. 4a and the film medium speed "v" appears in a projecting light beam.

FIG. 4c shows an example of intensity requirements of picture sequence according to FIG. 4a.

FIG. 4d shows the qualitative characteristic of the output voltage of the control unit according to the intensity correction requirements.

FIG. 4e shows the qualitative characteristic of the control voltage at the output of the control element according to FIG. 2 without and with enlargement of the rising, respectively falling times.

DETAILED DESCRIPTION OF THE DRAWINGS

Figure 1:
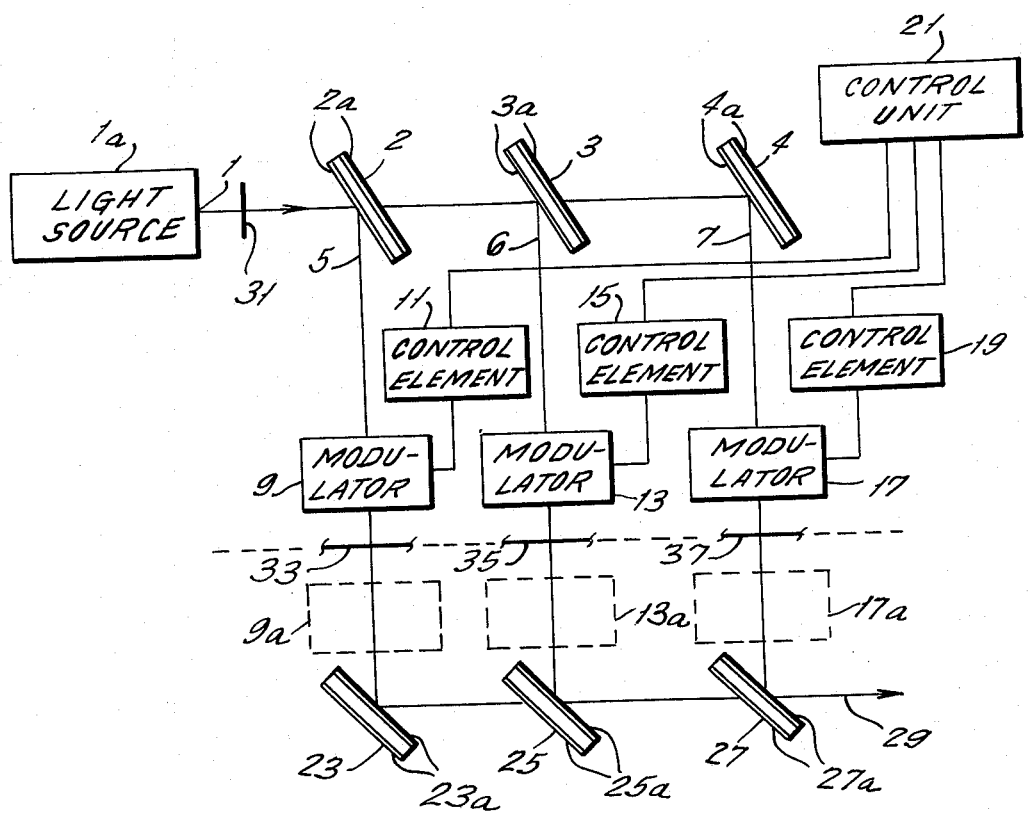
FIG. 1 shows a system diagram of the embodiment described showing different possibilities of system use.

The drawing shows a multi-color beam 1 passes through three partly permeable dichroic mirrors 2, 3, 4. The multi-color beam 1, e.g., a white, light beam, can emanate from a light source 1a or can be created from the light imaged by an optical lens system, or light from a camera or directly from natural surroundings. In one embodiment of the invention, beam 1 from lamp 1a is an unpolarized white, light source which is appropriately collimated, and then modulated by passing through a color transparency 31. If the light source 1a is used, it can contain a single wide spectrum lamp, or can contain several light sources of different colors, which may contain HG, Na or Cd vapor lamps and the like. A suitable heat filter (not shown) may be arranged between the light source or source 1a and the following optical system.

Each of said mirrors 2, 3 and 4 reflects one of the color components red, green or blue, as mono-color beams 5, 6 and 7 of a respective color channel. The reflected red beam is attenuated by a first intensity modulator 9 which has an appropriate intensity control element 11. Similarly, the blue mono-color beam 6 is attenuated by a modulator 13, controlled by a control element 15, and the third, green mono-color beam 7 is attenuated by a modulator 17 controlled by a control element 19. The modulators 9, 13 or 17 may be either of electro-optical or magneto-optical type and may more generally be of the field controlled type. If the light source 1a or light beam 1 is non-polarized light, suitable polarizers may be placed in front of each of modulators 9, 13 and 17.

Modulators 9, 13 and 17 may be Faraday systems or Kerr cells or resonator controlled crystals such as ammonium dihydrogen phosphate crystals (ADP) or potassium dihydrogen phosphate crystals (KDP). As is well known, Kerr cells require relatively high control voltages of several thousand volts. The use of ADP and KDP crystals are advantageous since they require lower control voltages of about 50 volts when high Q HF-resonators are used as control elements. These resonators can be cavity resonators or coaxial resonators (Lecher resonators) and have a high resonance frequency, e.g., in the MHz, or even GHz range. ADP or KDP crystals activated by such oscillations will, as is known in the art, become transmittent or non-transmittent in synchronism with the resonators' oscillations. These on/off switching frequencies are much too high for detection by the human eye. If the control elements comprise, as just described, high frequency resonators, one can control the rising or falling time of the resonators' oscillations to their stationary amplitudes and back to zero by choosing the appropriate damping factor, given by the resonance frequency and the Q factor (loaded Q). The switching behavior of ADP or KDP crystals when switched from one transmission level to another can, therefore, be controlled by selection of resonators' Q factor. This factor can be varied with tuner plungers, as is known in microwave art.

Other modulators which can be used are ultrasonic modulators which belong to the electro-optical category.

The output beams from the modulators 9, 13 and 17, of the drawing are deflected by partly permeable dichroic mirrors 21, 25 and 27 and subsequently additively mixed to result in a multi-color output beam 29.

The plane of mirrors 2, 3, 4 and of mirrors 23, 25 and 27 are preferably tilted with respect to the optical axes of the input and output beams 1 and 29, respectively, by 30° and not by 45° as is conventional, thereby reducing significantly the polarization effect at the surfaces of mirrors 2, 3, 4, 23, 25 and 27.

The mirrors 2, 3, 4, 23, 25 and 27 can act as color filters of extremely good discriminating effect when provided with anti-reflex coatings 2a, 3a, 4a, 23a, 25a and 27a, on one, or both of their surfaces so as to eliminate double reflection. These anti-reflex coatings will be matched to the particular color bands of the beams having to be reflected on the particular mirror. The use of anti-reflex coatings also prevents the occurrence of double images, and further results in a substantially higher brilliance of the colors.

The control elements 11, 15 and 19, control the modulators 9, 13 and 17, respectively, in the usual manner, and receive control signals from a control unit 21 which controls the control elements 11, 15 and 19 in order to vary light intensity of the mono-color beams 5, 6 and 7 by changing transparency of the modulators 9, 13 and 17, respectively. These electrical signals will have a suitable character depending upon the choice of the modulators and their control elements.

The control unit 21 will provide a series of control signals to the control elements to change the channel intensity by an amount related to control signal frequency, this frequency being suitable for film copying operations. Thus, damping-factor-influenced switching behavior will result in greater or smaller overlapping zones of intensity modulation cycles according to subsequent pictures.

Information as to how the mono-color beam intensities are to be varied can be obtained from light intensity measurements in each mono-color beam or in the resultant multi-color beam 29. The control unit 21 can also be used to store previously determined color correction values and to generate appropriate preprogrammed correction signals for control elements 11, 15 and 19.

The system may be used to produce black and white transparencies or films from a multi-color image containing beam 1. Beam 1 may be produced as an image of natural surroundings or can be the image in a camera system, or as previously described, can be produced by color transparency 31. Thus, transparency 31 can introduce, in a beam of white light source 1a, contour- and mono-color-intensity information of the picture. Each of the three color channels containing beams 5, 6 and 7 may now further contain three film-media 33, 35 and 37, e.g., black and white films which will store the information in the mono-color beams 5, 6 and 7. For this purpose, only the upper part of the system shown in the drawing will be used, without the recombining mirrors 23, 25 and 27, the dashed line showing the division of the whole system in two sub-systems.

If color pictures stored on black and white film media produced as described above, are to be reproduced, they will have to be first projected from the specific films by mono-color light beams of the same color by which they were produced and then recombined in the lower part of the system, by recombining mirrors 23, 25 and 27 to produce an output beam 29 which contains all information for color picture projection. In this case the entire system shown in the figure can be used, in that the projecting mono-color beams can be produced by a splitting system as shown in the upper part of the system or with the mono-color beams passing through black and white or mono-color transparencies at the locations 33, 35 and 37.

Correction of the intensities of the mono-color beams can be affected during copying on the films by modulators 9, 13 and 17 which are arranged in the respective mono-color beam channels as shown in the figure, and can be affected during reproduction by similar modulators 9a, 13a and 17a with appropriate control elements positioned between the film media 33, 35 and 37 and mirrors 23, 25 and 27.

When using the system for copying color films or transparencies at position 31 onto black and white films at positions 33, 35 and 37, high brilliance of the color picture will be improved when using a tungsten band lamp or a similar light source 1a, to produce the multi-color beam 1. The incandescent surface of such lamps develops an absolutely uniform light density and thus prevents light polarization, as is caused by the helical filaments of ordinary bulbs. Tungsten band lamps will also be preferably used in reproducing color pictures from black and white stored images 33, 35 and 37, with the same advantages.

It is obvious that the intensity of the multi-color beams 1 and 29 can be influenced by using grey filters or graded grey filters based on light reflection or light absorption or by using color filters (so-called trimming filters). Such filters can also be introduced in other beam parts, especially in the mono-color beams to appropriately off set their intensities.

Instead of using dichroic mirrors for mirrors 2, 3, 4, 23, 25 and 27, which act as reflection filters, it is also possible to use transmission filters or absorption filters and combinations of the various filter types. According to the kind of filters chosen, the multi-color beam will have to be split into a number of multi-color beams which will be filtered, as by absorption filters, to produce the mono-color beams. These techniques are well known and need not be described here. It is also possible to insert glass-fibre conductors at any point of the beam path and to arrange certain parts of the system optically remote from others.

Finally, the modulators 9, 13 and 17 and 9a, 13a and 17a may consist of liquid crystals if a frame frequency not higher than about 25 frames a second is acceptable.

It is also possible to use, instead of the mentioned light modulators, light multipliers acting as modulators.

With this system, it is possible to store color pictures on film media, especially black and white media, and to reproduce the original color pictures from said film media. It is also possible to directly copy color pictures, e.g., on color films. It is possible to correct the intensity of the various color contents at high switching frequencies to allow film copying at speeds up to 30,000 m/h. By selecting the switchover characteristics of intensity levels, intensity changes can be made more or less abrupt. The intensity level of the various color components can be infinitely varied, either as a function of picture copying speed or independently therefrom.

Figure 2:
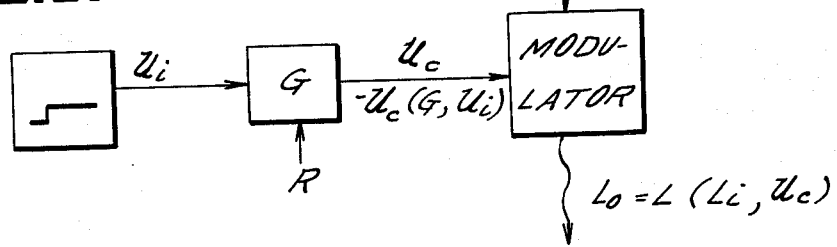
FIG. 2 shows a block diagram of a system for controlling a modulator with DC-voltage and changing the system switching behavior when switched from one intensity level to another.

FIG. 2 schematically shows a light modulator with an input light beam $L_i$ and an output beam $L_0$ the intensity of which is a function of the input beam intensity and the modulator control voltage $U_c$. The control element G provides the control voltage $U_c$ according to its input voltage $U_i$ which is generated in a control unit. As the modulator in this example shall be DC-voltage controllable, the control unit provides a DC output voltage $U_i$ with changeable level according to intensity correction requirements as for example shown in FIG. 4d. For changing the response of $U_c$ with respect to level variations of the DC voltage $U_i$, the control element G can, e.g., consist of a RC-T-network with variable resistance R. According to the transmission function G (p) of the control element the control voltage $U_c$ will show changeable rising and falling times as is qualtatively shown in FIG. 4e.

Figure 3:
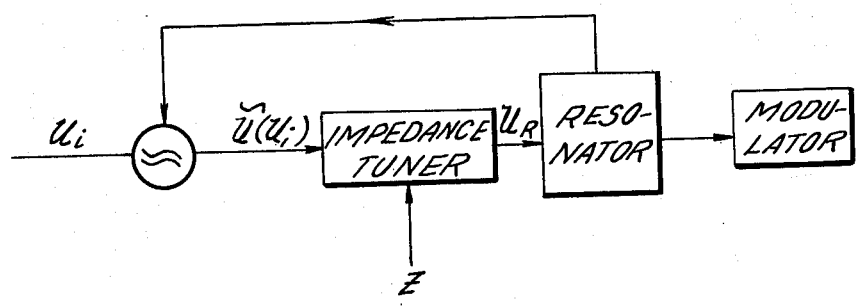
FIG. 3 shows a block diagram of a system for controlling a modulator with AC-voltage and for changing the time in which the amplitude of a control signal changes from one to another level.

FIG. 3 shows a modulator which is AC-voltage controllable by a resonator, e.g., a cavity resonator. The appearing impedance of the resonator for a microwave generator can be changed by an impedance tuner. According to intensity requirements of succeeding pictures, the microwave generator is amplitude-modulated by the output voltage $U_i$ of a control unit. The resonator will be stimulated to oscillations according to the amplitude of the generator output signal and its coupling to the generator, which is a function of the tuner setting. The amplitude of the resonator's oscillations will change its level with variable times according to the setting of the impedance tuner and so with the coupling of the resonator. As the oscillations will also change its stationary level in dependency on the coupling, it will be necessary to change the modulating effect of $U_i$ on the microwave generator to compensate for changes in stationary amplitude values. This fact is shown by the feed-backline from the resonator back to the generator.

AC control of the modulator can obviously also be done by resonator circuits built up with discrete elements if only the resonance frequency is high enough. In such circuits the rising or falling times of the amplitude level can be varied by changing the value of a damping resistor.

Although the present invention has been described in connection with a preferred embodiment thereof, many variations and modifications will now become apparent to those skilled in the art. It is preferred, therefore, that the present invention be limited not by the specific disclosure herein, but only by the appended claims.

I claim:

1. A system for color correction of color picture information contained in a projected multi-color light beam in photographic or cinematographic equipment, comprising: means to produce a plurality of mono-color light beams each of a different primary color, and each with complete picture contour- and single-color-information, according to the distribution of said color in said color picture, over their cross-sections; a respective field control type light modulator in the path of each of said mono-color light beams, each of said modulators being operable to continuously vary the light intensity of each of said mono-color beams, each of said light modulators having a respective electric control input element to provide said modulators with intensity controlling signals for continuously variable modulation affect, and a control unit connected to said control elements to remotely control said modulators.

2. The system of claim 1, wherein said control unit is operable to provide a series of signals for control intensity modulation of each said modulator with respect to different color corrections of subsequently provided color pictures to be color corrected.

3. The system of claim 2, wherein switchover behavior of said control elements in switching their intensity controlling signals from one level to another, according to signal sequence frequency of their input signals from said control unit, is changeable by changing the electric damping factor of said control elements.

4. The system of claim 1, wherein said field-controlled light modulators comprise light-modulating crystals and wherein said electric control elements are HF-resonators respectively connected to said crystals, and wherein said control unit is connected to provide exitation signals for each of said HF-resonators, with subsequently changing amplitudes according to color information of subsequently provided multi-color pictures to be differently color corrected, the damping factors of said resonators being variable to vary the switching behavior of said resonators when exitation signal amplitudes are switched from one to another level.

5. The system of claim 1, which further includes respective image storage means positioned in each of said light beam paths and adapted to store the respective image of said mono-color light beam in each of said light beam paths.

6. The system of claim 5, wherein said storage means comprises a black and white film negative.

7. The system of claim 6, wherein said multi-color beam is produced by at least one multi-color light source passing through a color transparency or film to get contour and color information therefrom.

8. The system of claim 7, wherein said light source comprises at least one non-polarized tungsten band lamp.

9. The system of claim 7, wherein said light source comprises a plurality of non-polarized light sources of different color outputs.

10. The system of claim 1, wherein said multi-color light beam is produced by a multitude of light beams, each of said light beams passing a film medium with color intensity information and contour information of a specific color picture, said beams having passed said film media being additively mixed to form the projecting multi-color beam.

11. The system of claim 10, wherein said multi-color of light beams comprise mono-color light beams, whereas the film media being black and white film media, containing contour and intensity information of specific light beam colors.

12. The system of claim 1, wherein a multi-color light beam containing contour and color information of a multi-color picture is split by selective filters into several mono-color beams, latter beams being intensity corrected by light modulators and additively mixed by selective filters to a color corrected output projecting multi-color beam.

13. The system of claim 2, wherein the damping factors of the control elements are such that the rising and falling switching edges allow switching frequencies for different subsequently provided multi-color pictures at a sequence frequency up to 30,000 meters per hour film speed, without one switching cycle influencing the next one.

14. The system of claim 1, wherein said means to produce said plurality of mono-color light beams are selective filters.

15. The system of claim 14, wherein said selective filters are anti-reflex coated dichroic mirrors.

16. The system of claim 15, wherein said selective filters are transmission and/or absorption filters, each filter having multi-layer anti-reflex coatings.

17. The system of claim 1, wherein said multi-color projecting beam and/or the mono-color beams being intensity off set by insertion of stationary intensity modulators.

18. The system of claim 17, wherein said stationary modulators being grey filters or graded grey filters or trimming filters.

19. An additive color mixing apparatus for photographic equipment comprising, in combination: a light source; a color transparency; a plurality of partly permeable dichroic mirrors each having a reflective coating for producing a different one of the primary colors, each containing an anti-reflex coating; a plurality of electric field-controlled optical modulators; and a plurality of mirror means for producing a reconstituted color image of said color transparency after color correction of individual colors in said image; each of said plurality of dichroic mirrors and a respective one of said plurality of electric field-controlled optical modulators and a respective one of said plurality of mirror means defining a respective color channel for respective colors of said color transparency; said color transparency being disposed between said light source and each of said plurality of dichroic mirrors, whereby, in each said color channel, an image of color defined by said dichroic mirror in said channel passes sequentially through said dichroic mirror, said optical modulator and said mirror means; said plurality of dichroic mirrors being tilted with respect to the axis of its respective color channel; said plurality of electric field-controlled optical modulators each being constructed to adjustably control the intensity of the light in each of said color channels with relatively short-time control and substantially without residual oscillation and overlapping.

20. The color mixing apparatus of claim 19, wherein said light source comprises a non-polarized lamp.

21. The color mixing apparatus of claim 20, wherein said plurality of electric field-controlled optical modulators each include a low voltage controlled resonator connected to control a light modulating crystal.

22. The color mixing apparatus of claim 20, wherein said lamp is a tungsten lamp.

23. The color mixing apparatus of claim 20, wherein each of said plurality of dichroic mirrors are tilted at an angle of about 30° to the optical axis of their said respective color channel.

24. The color mixing apparatus of claim 21, wherein said low voltage controlled resonators each comprise respective cavity resonators.

* * * * *

UNITED STATES PATENT AND TRADEMARK OFFICE
CERTIFICATE OF CORRECTION

PATENT NO. : 4,087,176
DATED : May 2, 1978
INVENTOR(S) : Jurg Nigg

It is certified that error appears in the above—identified patent and that said Letters Patent is hereby corrected as shown below:

On the first page between the Items [63] and [51], insert the following:

[30] Foreign Application Priority Data

Dec. 14, 1972 [CH] Switzerland ..................18254/72

Signed and Sealed this

Twenty-seventh Day of July 1982

[SEAL]

Attest:

Attesting Officer

GERALD J. MOSSINGHOFF
Commissioner of Patents and Trademarks